G. C. THOMAS, Jr.
ELECTRICAL CONNECTING DEVICE.
APPLICATION FILED NOV. 21, 1919.
1,418,989.
Patented June 6, 1922.
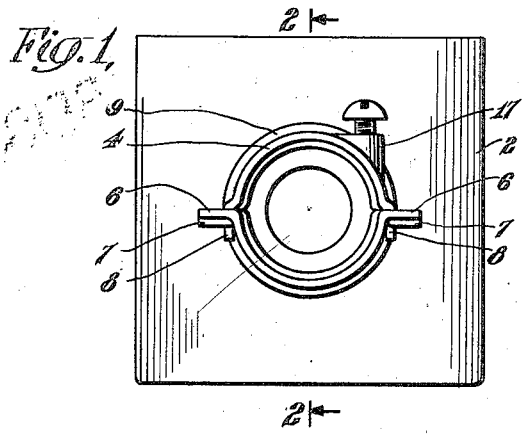
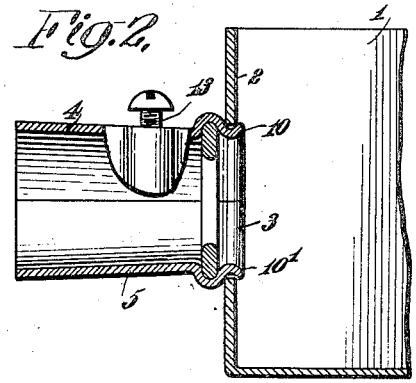
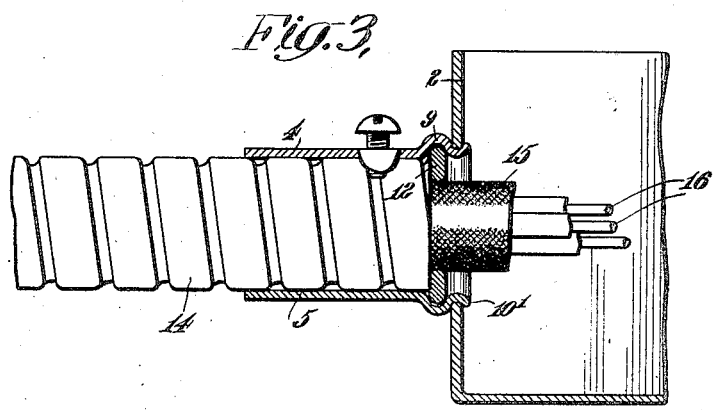
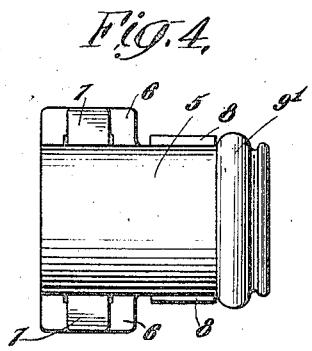
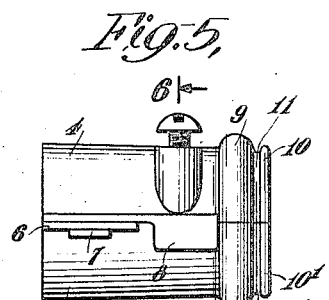
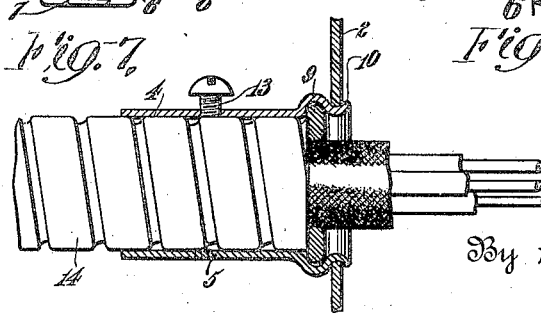
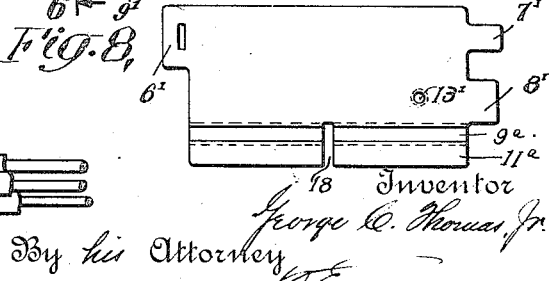
Inventor
George C. Thomas, Jr.
By his Attorney

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

ELECTRICAL CONNECTING DEVICE.

1,418,989.  Specification of Letters Patent.  Patented June 6, 1922.

Application filed November 21, 1919. Serial No. 339,575.

*To all whom it may concern:*

Be it known that I, GEORGE C. THOMAS, Jr., a citizen of the United States, residing at Elizabeth, in the county of Union and State of New Jersey, have invented certain new and useful Improvements in Electrical Connecting Devices, of which the following is a specification.

My invention relates to devices for connecting metallic conduits and the like to electric outlet boxes and the like. Constructions have previously been described wherein connection between an electrical conduit and an outlet box is made by means of a sleeve which is formed in two parts, these parts being secured together adjacent one end thereof in such fashion that the opposite ends of the parts are free to move through a limited movement toward and away from each other. The parts are provided at the ends last referred to with a grooved seat, that is, a portion of the periphery of the sleeve having flanges on opposite sides of the same. This seat portion may be inserted within an opening in the wall of an outlet box and the parts of the sleeve forced apart, into binding engagement with the periphery of the opening in the outlet box wall, by suitable means, such as screws extending through threaded openings in one of the parts of the sleeve and bearing against flanges in the opposite part of the sleeve, so that adjustment of the screws forces the parts of the sleeve away from each other, into binding engagement within the opening in the outlet box wall.

My present invention comprises an improvement upon devices of the character above referred to, whereby the construction is simplified and rendered more efficient. My present improvement consists, broadly, in making use of an adjustable means which engages one of the parts of the sleeve and bears directly upon a conduit within a sleeve, so that adjustment of the same results in binding the conduit firmly in position within the sleeve and at the same time forcing apart the members of the sleeve into firm engagement with the periphery of the opening in the outlet box. Preferably I accomplish this result by the use of a single screw which is mounted within a threaded opening in one of the parts of the sleeve so that the end of the screw may be caused to engage the periphery of an electric conduit within the sleeve. Tightening the screw results in forcing the conduit firmly against the opposite member of the sleeve and at the same time forcing both members of the sleeve into binding engagement within the opening in the outlet box, the single screw thereby performing a double function in a simple and effective manner.

In order that my invention may be more clearly understood attention is hereby directed to the accompanying drawings forming part of this application and illustrating certain embodiments of my invention.

In the drawings Fig. 1 represents a front elevation of an outlet box having one form of my connecting device loosely mounted in an opening therein, Fig. 2 is a vertical section taken on the line 2—2 of Fig. 1, with certain parts shown in side elevation, Fig. 3 is a section similar to that shown in Fig. 2 with a portion of an electrical conduit shown therein in elevation, the connecting device being shown as adjusted into holding position, Fig. 4 is a bottom plan view of the connecting device shown in the preceding figures, Fig. 5 is a side elevation of the same, Fig. 6 is a vertical section taken on line 6—6 of Fig. 5, Fig. 7 is a sectional view, similar to that shown in Fig. 3, of a modified form of construction; and Fig. 8 shows a blank from which a connecting device embodying my invention may be formed from one piece of sheet metal.

Referring to the drawings, outlet box 1 is illustrated as having a front wall 2 in which an opening 3 is illustrated. The connecting device illustrated in Figs. 1 to 6 inclusive comprises upper and lower sleeve members 4 and 5, each of which may be approximately semi-circular in cross section.

These sleeve members are connected together adjacent their outer or left hand ends, referring for example to Fig. 5, by some means permitting movement of the opposite ends of the parts in a generally radial direction. As is illustrated, the lower sleeve member 5 may be provided adjacent its rear end with a pair of horizontal outwardly directed flanges 6, 6 which are apertured to receive a pair of tongues 7, 7, which are bent downwardly from the lower edges of the upper sleeve member 4 and are then bent horizontally under flanges 6, 6. These form a pivotal connection about which the opposite or right hand ends of sleeve members 4 and 5 may oscillate through a limited movement. The upper sleeve member 4 is provided, forwardly of the flanges 6, with a pair of downwardly extending ears 8, 8, which engage the outer surface of the member 5, to keep the parts in alignment.

Adjacent to the forward ends of members 4 and 5, outwardly convexed peripheral ribs 9, 9' are formed. Outwardly extending peripheral flanges 10, 10' are formed at the extreme right hand ends of the sleeve members 4 and 5, so that a grooved or convexed seat is provided between the flanges 10, 10', and 9, 9', this seat being indicated at 11, 11', in connection with the parts 4 and 5 of the sleeve. The formation of the rib 9, 9', provides a corresponding recess within the sleeve members, which may be utilized as a seat or retaining means for a rounded ring or sleeve 12.

The upper sleeve member 4 is provided with a threaded opening therein part way between the pivotal connection formed by the flanges 6 and 7, and the peripheral seat 11, 11¹. A screw 13 is mounted in this threaded opening in such position that its inner end is adapted to bear against a conduit 14 when the latter is mounted within the sleeve comprising members 4 and 5.

The conduit 14 illustrated is a flexible metallic conduit of the usual character which surrounds a casing 15 of non-metallic character within which the electrical conductors 16 are carried. In the form of my invention illustrated in Figs. 1 to 6 the screw 13 is mounted in a boss 17 formed at one side of the sleeve member 4, so that the end of screw 13 will bear more or less tangentially against the conduit 14. In the modification illustrated in Fig. 7 the boss 17 is omitted and screw 13 bears directly and radially against the conduit 14. The action is the same in both cases, the advantage of the first described form being that tendency to puncture or injure the outer surface of the conduit is decreased by causing the screw to bear against the same at an inclination.

In operation, a conduit is inserted within the outer end of the two sleeve members until the forward end of the metallic armor on the outer surface of the conduit comes into contact with the ring 12, a length of the casing 15 extending through ring 12. The sleeve is then slipped into position in the opening 3 in wall 2 of the outlet box, flange 10, 10¹ being of a sufficiently small diameter, when the parts 4 and 5 of the sleeve are in their closed or innermost position, to pass through the opening 3, as is shown in Fig. 2. The screw 13 is thereupon screwed into firm engagement with the outer covering of conduit 14. The conduit is thereby pressed against the bottom of sleeve member 5, which is accordingly pressed against the lower portion of the periphery of opening 3. At the same time, obviously, as the screw is moved downwardly through its threaded opening in the upper sleeve member 4, the latter is forced upwardly into binding engagement with the upper portion of the periphery of opening 3 so that the conduit is firmly clamped between the end of screw 13 and the sleeve member 5, and sleeve members 4 and 5 are firmly secured by the engagement of the grooved seat 11, 11', within the periphery of the opening 3 in the outlet box. The conduit obviously may be removed from the connection, and the sleeve removed from the outlet box, by simply unscrewing screw 13.

In Fig. 8 I have shown a blank of thin sheet metal from which the device may be formed, in place of the two sleeve members 4 and 5. It will be noted that the tongue 7' may be inserted through the slot in the flange 6', and tongue 7' and flange 6' bent in the same manner as one pair of tongues 7 and 6 in the form of device already described; also that flange 8' may be bent to extend alongside the opposite cylindrical surface of the device in the same manner as one of the ears 8 in the form of device already described. The screw will extend through opening 13'. The parts 9ª and 11ª of the sheet are pressed to form a rib portion similar to the ribs 9, 9', and a seat and flange portion similar to the seat and flange 11, 11' 10, 10', respectively, in the form of device already described. The slit 18 is formed through the parts 9ª, 11ª, to divide these parts into halves, to aid in the enlargement and restriction of the seat portion of the device within the opening in wall 2 of the outlet box, as previously described.

It will be understood that my invention is not strictly limited to the exact details of construction described, but is as broad as is indicated by the accompanying claims.

What I claim is:

1. In connecting devices, the combination of an outlet box having a wall with an opening therethrough, a sleeve device adapted to receive an electric conduit, said device having a seat portion adapted to bind within said opening and comprising a plurality of parts adjustable to cause enlargement or restriction of said seat portion, one of said parts having an opening therein and said parts jointly having a peripheral groove within the same, adjacent said seat portion, a screw mounted in said opening and arranged to bear upon a conduit within said device, to bind the conduit in position and simultaneously force the parts of said seat portion into firm engagement with the periphery of said wall opening, and a ring retained within said groove, to form a stop for the forward end of the outer armor of the conduit.

2. In connecting devices, the combination of an outlet box having a wall with an opening therethrough, a split sleeve adapted to receive an electric conduit, having a seat portion formed of parts adapted to move inwardly or outwardly, and adapted to be inserted within said opening when in their inward position having a peripheral groove within the same, adjacent said seat portion, and an adjustable means engaging one of the parts of said sleeve and positioned to bear upon a conduit within said sleeve, so as to bind the conduit in position and simultaneously force the parts of said seat portion outwardly into firm engagement with the periphery of said wall opening, and a ring retained within said groove, to form a stop for the forward end of the outer armor of the conduit.

3. In connecting devices, the combination of a wall having an opening therethrough, a two-part sleeve adapted to receive an electric conduit, the parts of the sleeve being so secured together at one end as to permit movement of the parts at the other end toward and away from each other, said last named end of said parts being provided with a seat portion adapted to bindingly engage within said opening, and said parts jointly having a peripheral outwardly extending rib, forming a peripheral groove within the same, adjacent said seat portion, one of said parts having a threaded opening therein, a screw mounted in said threaded opening and arranged to bear upon a conduit within said sleeve, to bind the conduit in position and simultaneously force the parts of said seat portion away from each other, into firm engagement with the periphery of said wall opening, and a ring retained within said groove, to form a stop for the forward end of the outer armor of the conduit.

This specification signed and witnessed this 19 day of November, 1919.

GEORGE C. THOMAS, Jr.

Witnesses:
ADUAL McMURTUS,
H. VAN CATT HOLLAND.